(12) United States Patent
Jarczynski et al.

(10) Patent No.: US 6,346,753 B1
(45) Date of Patent: Feb. 12, 2002

(54) FAN AND ROTOR DYNAMIC GAS SEALING SYSTEM

(75) Inventors: Emil Donald Jarczynski; Sang Woo Lee, both of Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/551,578

(22) Filed: Apr. 18, 2000

(51) Int. Cl.$^7$ .................................................. H02K 9/00
(52) U.S. Cl. ............................. 310/53; 310/58; 310/59
(58) Field of Search ............................. 310/52, 53, 56, 310/58, 59, 60 R, 61, 62, 60 A, 64

(56) References Cited

U.S. PATENT DOCUMENTS

| | | | | |
|---|---|---|---|---|
| 2,873,393 A | * | 2/1959 | Baudry | 310/64 |
| 3,739,208 A | * | 6/1973 | Shartrand | 310/52 |
| 4,039,872 A | * | 8/1977 | Armor et al. | 310/62 |
| 4,051,400 A | * | 9/1977 | Armor et al. | 310/58 |
| 4,071,790 A | * | 1/1978 | Darby et al. | 310/59 |
| 4,071,791 A | * | 1/1978 | Armor et al. | 310/59 |
| 5,633,543 A | * | 5/1997 | Jarczynski et al. | 310/59 |

* cited by examiner

Primary Examiner—Nestor Ramirez
Assistant Examiner—Dang Dinh Le
(74) Attorney, Agent, or Firm—Nixon & Vanderhye P.C.

(57) ABSTRACT

A cooling system for a rotating electrical machine, such as a power generator, includes a cooling fan that serves to exhaust hot gas from an interior of the machine, a seal ring surface defining a passage for the exhausted hot gas, and a clearance seal positioned in the passage between a rotating body of the machine, such as a generator rotor, and a non-rotating body of the machine, such as a generator stator, to prevent the exhausted gas from entering an inlet to the rotating body. The seal ring surface is shaped to impart sufficient momentum to the exhausted hot gas to prevent the exhausted hot gas from leaking into the rotating body inlet. The contoured shape of the seal ring surface immediately downstream of the rotor is positioned such that the high velocity fan discharge stream is directed to flow along this surface. The high through-flow momentum of this gas stream does not allow any backward flow, thereby eliminating hot gas leakage. With this construction, the accurate and tightly controlled clearances of previous constructions are no longer required and may be greatly relaxed, providing a lower cost, more effective and higher efficiency sealing system.

6 Claims, 4 Drawing Sheets

FAN AND ROTOR DYNAMIC GAS SEALING SYSTEM

BACKGROUND OF THE INVENTION

The present invention relates to a cooling system for a rotating electrical machine and, more particularly, to a modified cooling circuit in a reverse flow electric power generator incorporating a contoured seal ring surface.

When cooling fans are mounted at the ends of rotating electrical machines, such as large power generators, they produce high pressure cooling air for distribution to the interior portions of the machine that need to be cooled. In cooling configurations, such as the prior art configuration shown in FIG. 1 —sometimes known as a "reverse flow cooling system," the cooling fan exhausts hot gas from the interior of the machine that has been cooled and directs this hot gas either to a heat exchanger to be cooled before re-entering the machine or exhausts it from the machine. In close proximity to this high pressure hot fan discharge is the inlet to the rotor, where lower pressure cold cooling gas is drawn by pumping suction into the rotor to cool it. A seal must be positioned between the high pressure hot gas discharging from the fan and the low pressure cold gas inlet to the rotor, or the rotor will detrimentally ingest hot gas into its cooling stream.

Typically, a clearance seal is positioned between the hot fan outlet and the cold rotor inlet to separate the two flow streams. A clearance seal relies on finely controlled clearance spaces between the rotating body and the non-rotating seal to inhibit the flow of hot gas into the rotor inlet. This construction, however, poses some problems. First, the fine clearances must be accurately and tightly controlled to provide minimal leakage of hot gas, which results in a difficult and costly assembly of rotating and stationary components. Second, since the fan discharges at a high pressure and the rotor inlet is at a lower pressure, some hot gas will inherently be drawn into the cold rotor inlet by virtue of the necessary finite clearance of the seal, resulting in ineffective rotor cooling and efficiency losses due to the recirculation of leaking hot gas.

While positive contact seals could be used to provide sealing between rotating and stationary parts, these contacting seals increase costs and produce a high amount of rotating drag friction that decreases the overall efficiency of a rotating machine. Non-contacting seals provide higher efficiency at lower costs and complexity.

BRIEF SUMMARY OF THE INVENTION

In an exemplary embodiment of the invention, a cooling system for a rotating electrical machine includes a cooling fan that serves to exhaust hot gas from an interior of the machine, a seal ring surface defining a passage for the exhausted hot gas, and a clearance seal positioned in the passage between the rotating body of the machine and a non-rotating body of the machine to prevent the exhausted hot gas from entering an inlet to the rotating body. The seal ring surface is shaped to impart sufficient momentum to the exhausted hot gas to prevent the exhausted hot gas from leaking into the rotating body inlet. The seal ring surface may be shaped such that the passage is narrower toward the rotating body inlet and wider away from the rotating body inlet. The passage preferably extends from the clearance seal to a diffuser, wherein the seal ring surface is contoured to direct the exhausted hot gas toward the diffuser. In one preferred construction, the rotating electrical machine is a power generator, the rotating body is a generator rotor, and the non-rotating body is a generator stator.

In another exemplary embodiment of the invention, a reverse flow electric power generator cooling circuit includes a cooling fan exhausting hot as from an interior flow passage between the rotor and the stator to an exhaust passage. A diffuser at one end of the exhaust passage receives the exhausted hot gas, and a rotor inlet passage is provided at an opposite end of the exhaust passage. A clearance seal is disposed between the interior flow passage and the rotor inlet passage to prevent the exhausted hot gas from entering the rotor inlet passage. The exhaust passage is shaped to impart momentum to the exhausted hot gas away from the rotor inlet passage.

DETAILED DESCRIPTION OF THE INVENTION

Figure 1:
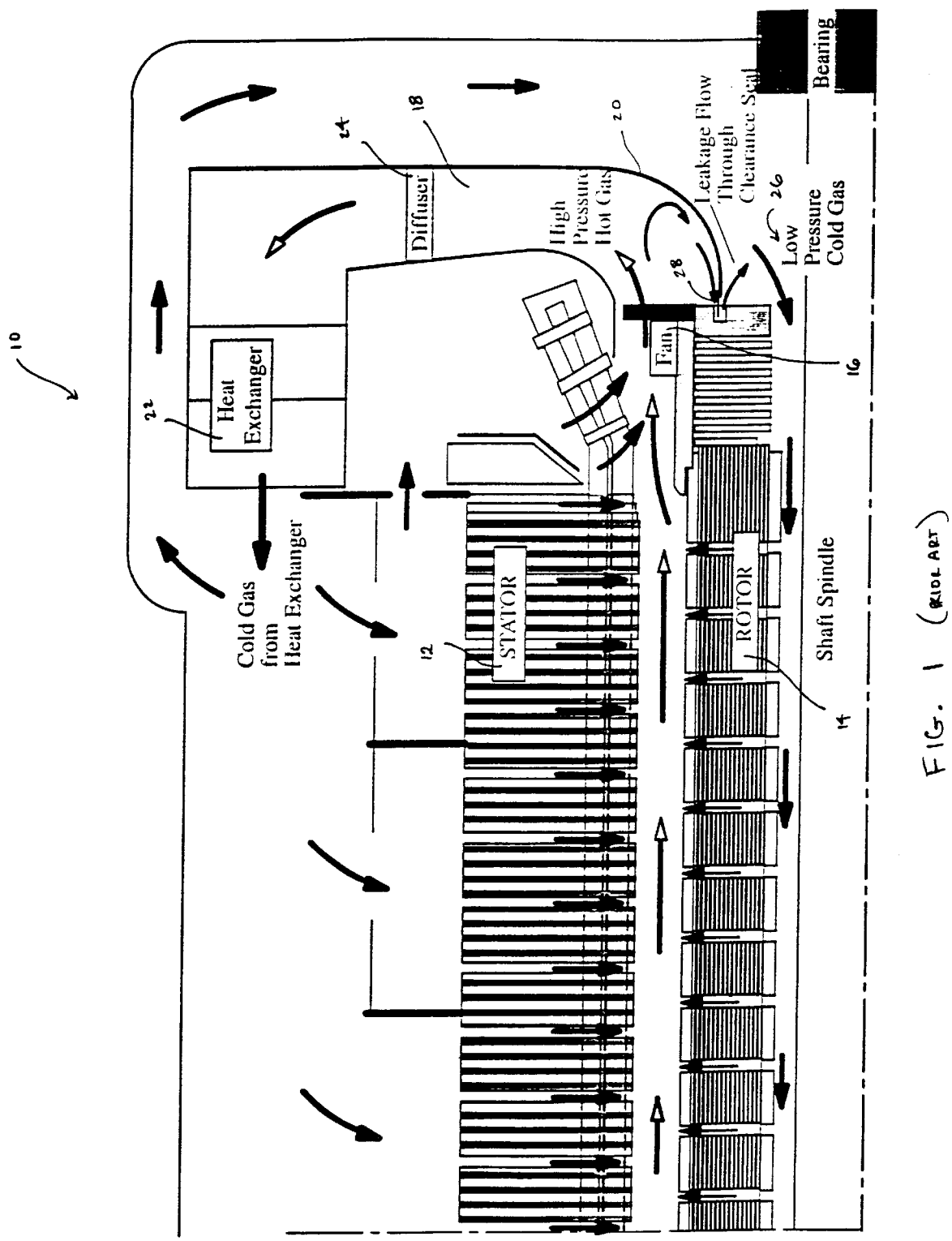
FIG. 1 is a schematic illustration of a conventional "reverse flow" electrical power generator cooling circuit.

With reference to FIG. 1, a reverse flow electric power generator 10 includes a non-rotating stator 12 and a rotating rotor 14. In a "reverse flow cooling system," a cooling fan 16 exhausts hot gas from the interior of the machine that has been cooled and directs the hot gas along a passage 18 defined by a seal ring surface 20 to a heat exchanger 22 via a diffuser 24. Typically, the exhausted hot gases are cooled in the heat exchanger 22 before re-entering the machine. Alternatively, the hot gases may be exhausted from the machine.

In close proximity to the high pressure hot fan discharge is a rotor inlet 26, where lower pressure cold cooling gas is drawn by pumping suction into the rotor 14 to cool it. A clearance seal 28 is positioned between the high pressure hot gas discharging from the fan 16 and the low pressure cold gas inlet 26 to the rotor.

When the cooling fan 16 is positioned to exhaust hot gas at the end of the rotor 14, such as in the conventional arrangement shown in FIG. 1, the exhaust stream is directed through the pressure diffuser 24. The diffuser 24 causes static pressure to regain in the exhaust gas stream, providing sufficiently high pressure for the cooling gas to re-enter the machine interior cooling circuit once its high temperature heat is removed in the heat exchanger 22. While the pressure increasing action of the fan 16 and diffuser 24 provides the needed pressure to circulate cooling gas through the machine, the high gas pressure in the diffuser 24 also imposes a driving force for hot gas through the clearance seal 28 into the low pressure cold gas stream. Thus, the high gas pressure that is needed for the cooling circuit also provides the driving force for ingestion of hot gas into the rotor 14, resulting in decreased cooling performance and lower efficiency.

Figure 2:
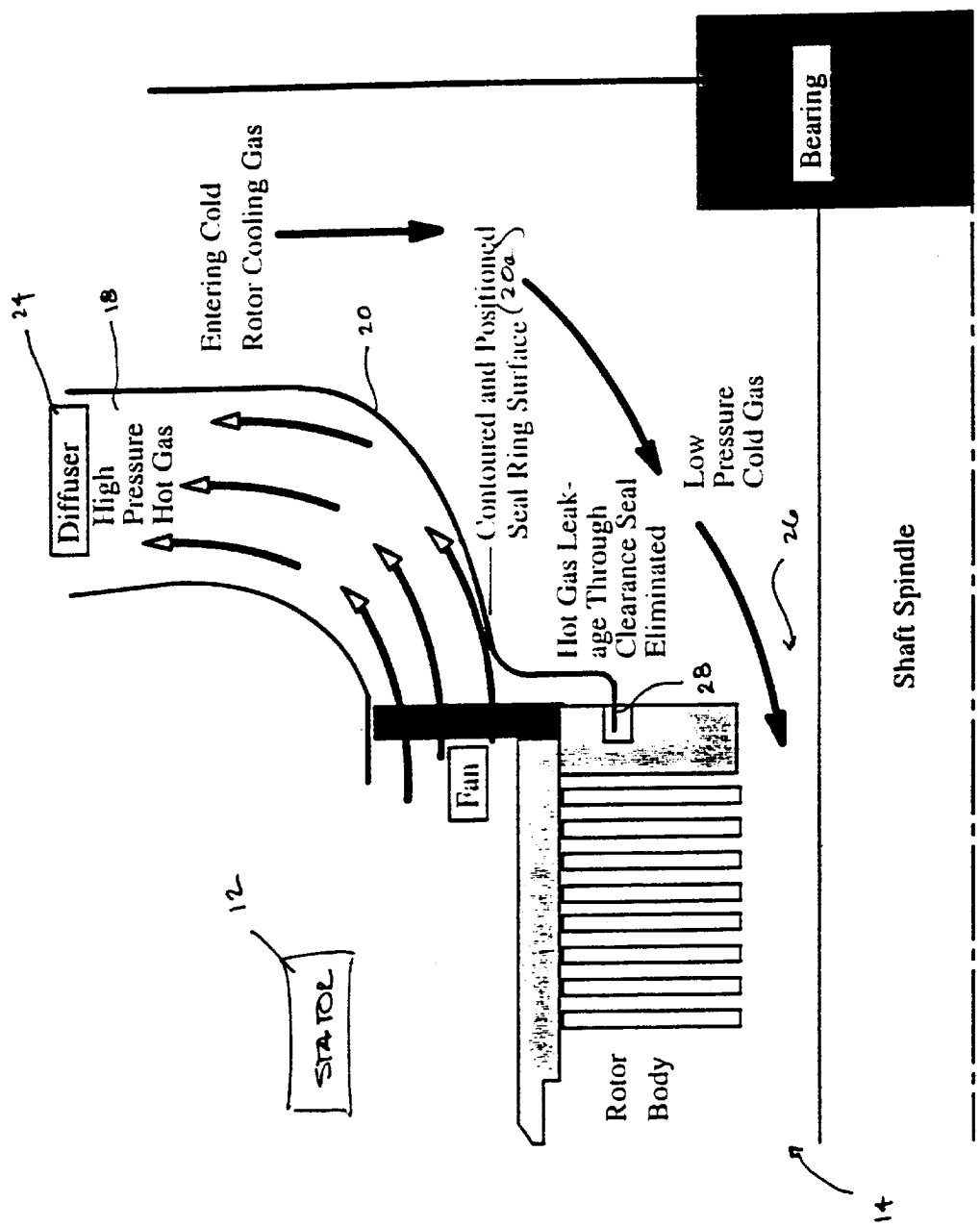
FIG. 2 illustrates the cooling circuit of the invention including a shaped seal ring surface.

Referring now to FIG. 2, a cooling system for a reverse flow electric power generator is schematically illustrated. The seal ring surface 20 of the cooling circuit of the present invention is contoured, at area 20a for example, so that it directs the high velocity fan discharge stream into the diffuser 24 and away from the opening near the clearance seal 28, such that the forward momentum of the flow stream helps to prevent leakage flow from flowing back toward the seal 28. As shown in FIG. 2, the seal ring surface 20 is shaped such that the passage is narrower toward the rotor inlet 26 and wider away from the rotor inlet 26. This positioned surface 20 need only extend sufficiently far into the diffuser 24 so that the high velocity through-flow momentum is established to block the backward leakage flow. The remainder of the diffuser can remain unchanged to provide the necessary pressure regain.

With a typical diffuser design, shown schematically in FIG. 2, the fan discharge velocity naturally decreases as it enters the diffuser 24. The diffuser flow areas are typically large to provide the required diffusing action. If the velocity decreases such that the lower velocity gas is able to change flow direction and the diffuser area is sufficiently large to allow a backward flowing stream, then the hot gas is drawn toward the lower pressure zone through the clearance seal 28. With the structure of the present invention, the contoured shape 20a of the seal ring surface 20 immediately downstream of the rotor 14 is positioned such that the high velocity fan discharge stream is directed to flow along this surface. The high through-flow momentum of this gas stream does not allow any backward flow, thereby eliminating hot gas leakage.

Figure 3:
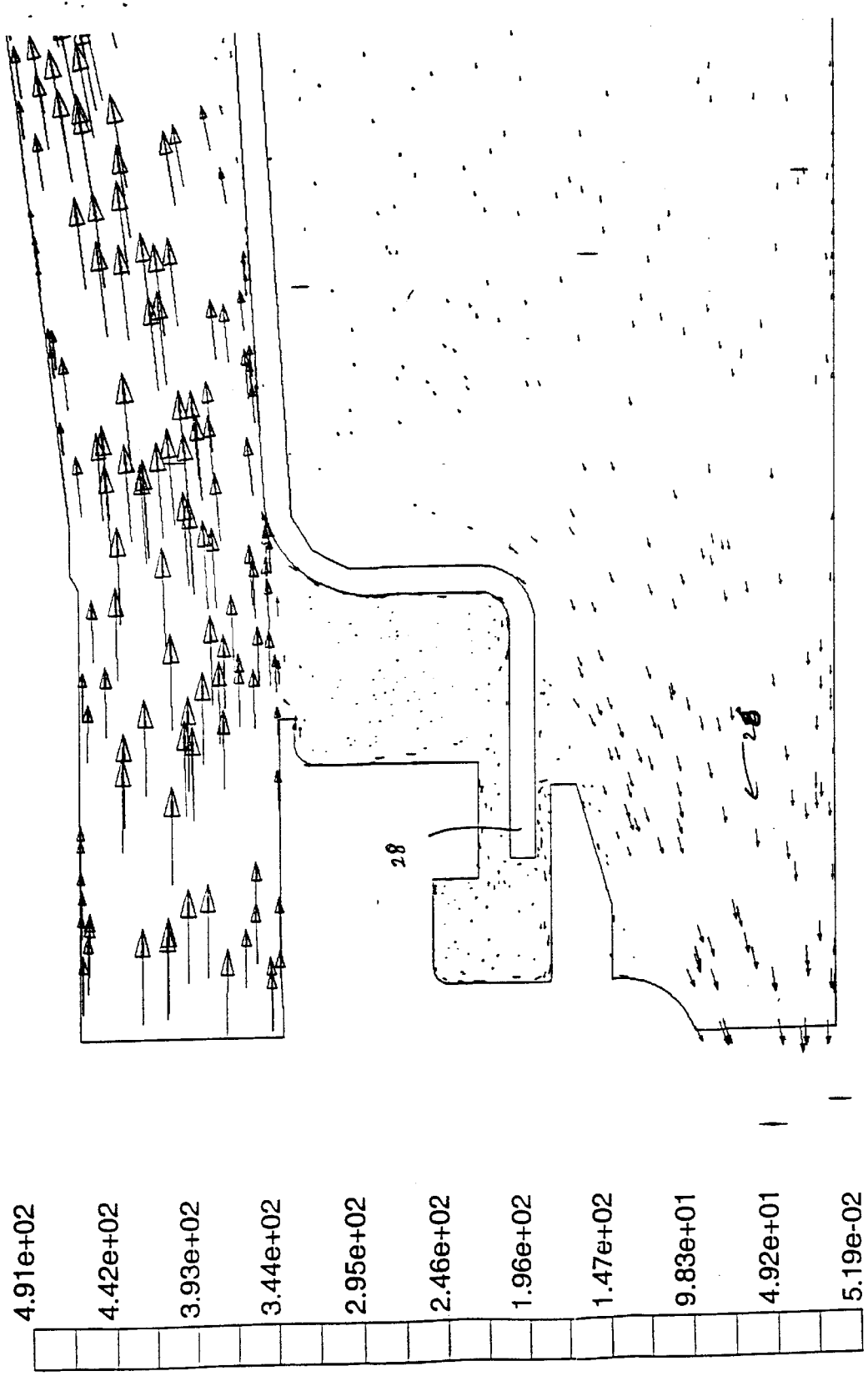
FIG. 3 is a computational fluid dynamic plot, showing air flow vectors with the seal ring surface of the present invention.
Figure 4:
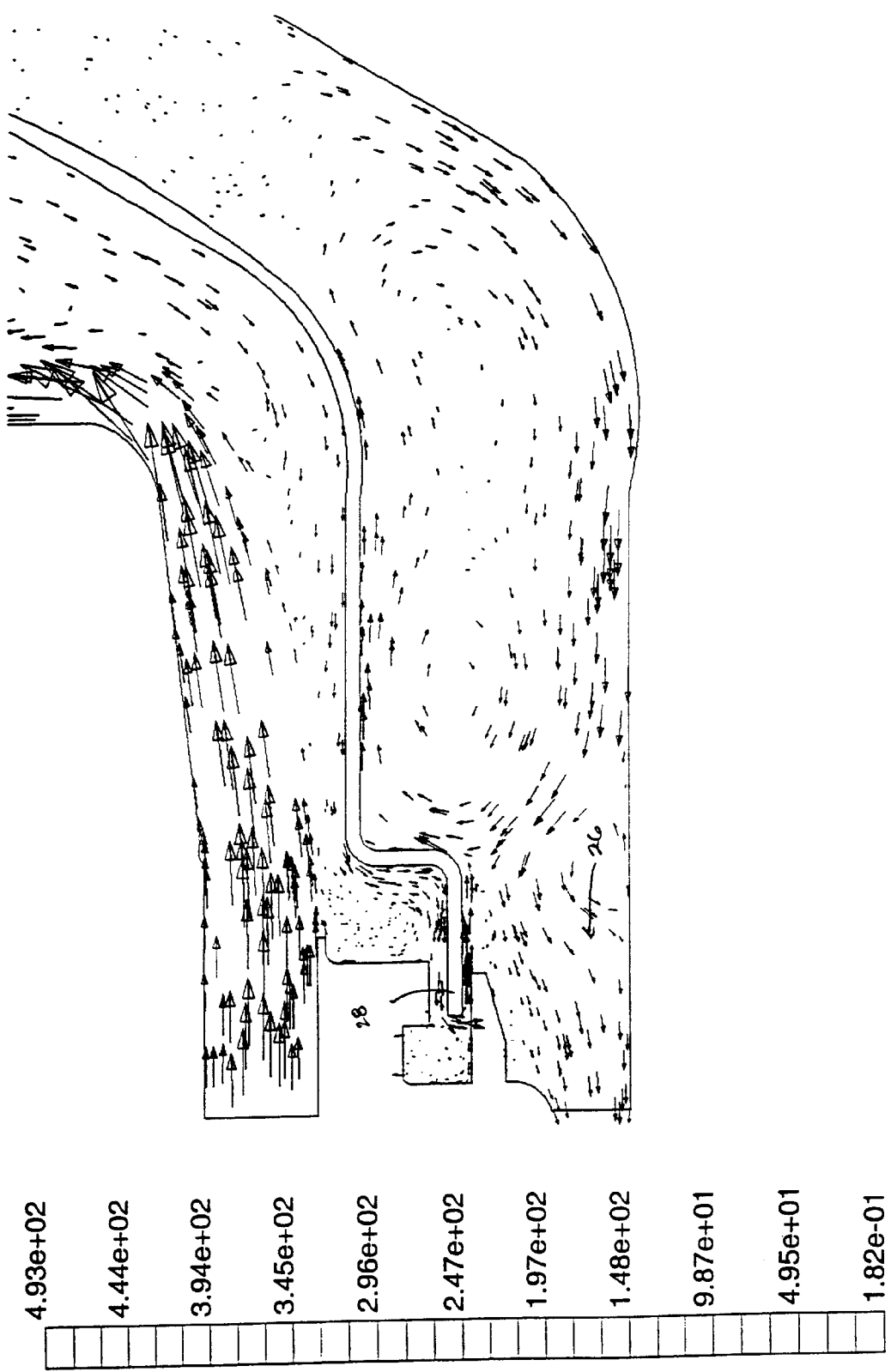
FIG. 4 is a comparison computational fluid dynamic plot, showing air flow vectors with the conventional cooling system.

FIGS. 3 and 4 show the results of a computational fluid dynamics analysis comparing fluid flow with the structure of the present invention and the fluid flow with the conventional arrangement. The flow field shown in FIG. 3 is the result from the application of the present invention, and the flow field of FIG. 4 is the result using the conventional structure. As can be seen from a comparison of the detected flow fields, the structure of the present invention achieves significant improvements over the conventional structure, resulting in a lower cost, more effective and higher efficiency sealing system. While some finite clearance between the rotating and stationary parts is still provided to prevent large-scale separation of the two flow streams, the accurate and tightly controlled clearances are no longer required and may be greatly relaxed.

Although the invention has been described in the context of a reverse flow electric power generator, those of ordinary skill in the art will contemplate alternative applications of the principles of the invention to various types of rotating devices such as those that produce pressurized airflow where flow inlets are proximate flow outlets, including, for example, electric motors, fans, blowers, and compressors.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A cooling system for a rotating electrical machine, the cooling system comprising:
    a cooling fan that serves to exhaust hot gas from an interior of the machine;
    a seal ring surface defining a passage for the exhausted hot gas; and
    a clearance seal positioned in the passage between a rotating body of the machine and a non-rotating body of the machine to prevent the exhausted hot gas from entering an inlet to the rotating body,
    wherein the seal ring surface is contoured such that the passage is narrowest adjacent the cooling fan to impart sufficient momentum to the exhausted hot gas to prevent the exhausted hot gas from leaking into the rotating body inlet.

2. A cooling system according to claim 1, wherein the passage extends from the clearance seal to a diffuser, and wherein the seal ring surface is contoured to direct the exhausted hot gas toward the diffuser.

3. A cooling system according to claim 1, wherein the rotating electrical machine is a power generator, the rotating body is a generator rotor, and the non-rotating body is a generator stator.

4. A reverse flow electric power generator cooling circuit, the generator including a stator and a rotor, the cooling circuit comprising:
    a cooling fan exhausting hot gas from an interior flow passage between the rotor and the stator to an exhaust passage;
    a diffuser at one end of the exhaust passage that receives the exhausted hot gas;
    a rotor inlet passage at an opposite end of the exhaust passage; and
    a clearance seal disposed between the interior flow passage and the rotor inlet passage to prevent the exhausted hot gas from entering the rotor inlet passage,
    wherein the exhaust passage is contoured such that the passage is narrowest adjacent the cooling fan to impart momentum to the exhausted hot gas away from the rotor inlet passage.

5. A cooling circuit according to claim 4, wherein the exhaust passage is narrower toward the clearance seal and the rotor inlet passage and wider toward the diffuser.

6. A cooling circuit according to claim 4, wherein the exhaust passage is defined by a seal ring surface, and wherein the seal ring surface is contoured to direct the exhausted hot gas toward the diffuser.

* * * * *

UNITED STATES PATENT AND TRADEMARK OFFICE
CERTIFICATE OF CORRECTION

PATENT NO. : 6,346,753 B1  Page 1 of 1
DATED : February 12, 2002
INVENTOR(S) : Jarczynski et al.

It is certified that error appears in the above-identified patent and that said Letters Patent is hereby corrected as shown below:

Column 2,
Line 3, delete "as" and insert -- gas --.

Signed and Sealed this

Twenty-third Day of April, 2002

Attest:

*Attesting Officer*

JAMES E. ROGAN
*Director of the United States Patent and Trademark Office*